Figure 1:
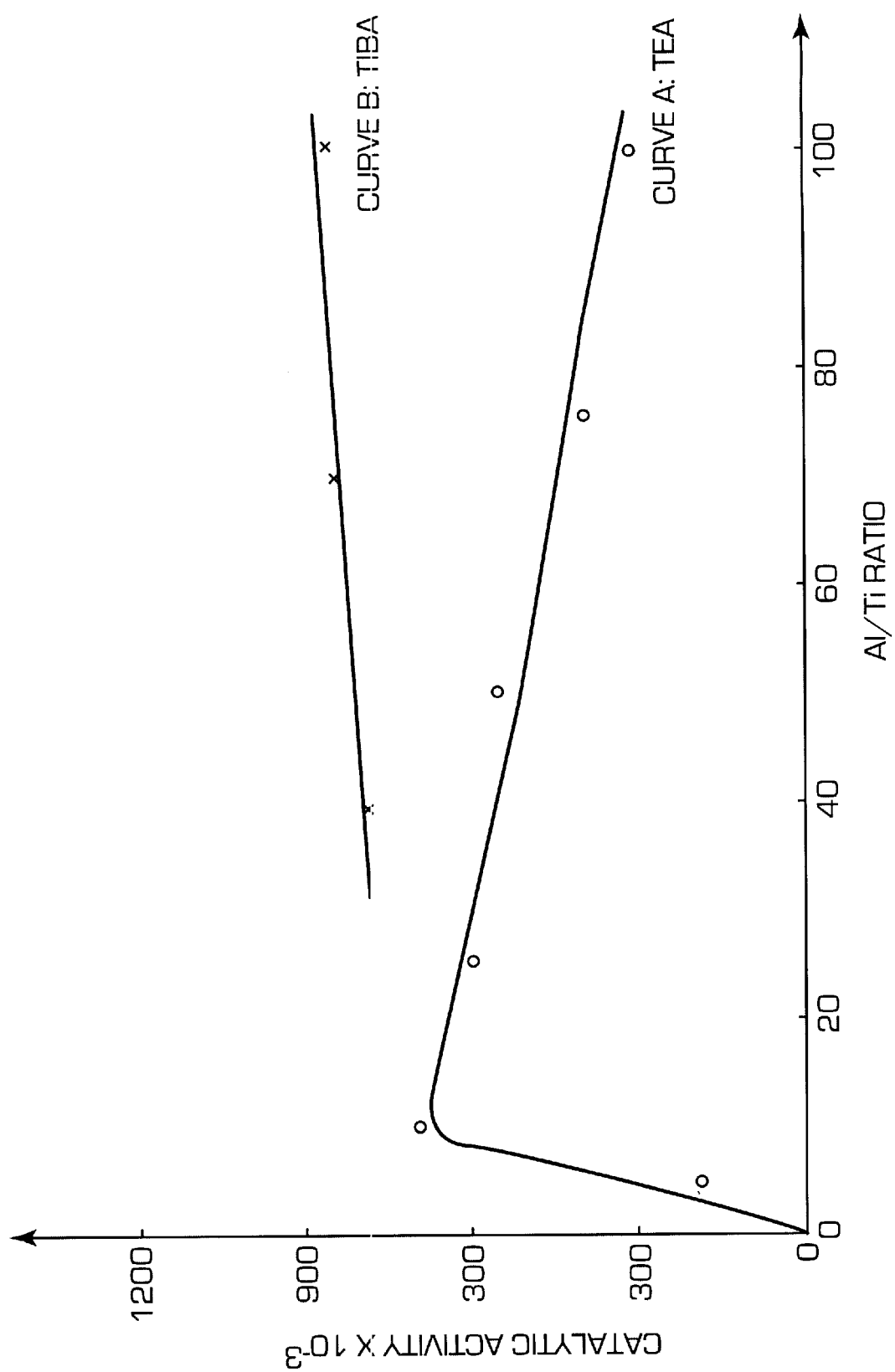

United States Patent [19]
Abarca et al.

[11] Patent Number: 6,018,006
[45] Date of Patent: Jan. 25, 2000

[54] PROCESS FOR PREPARING AN ETHYLENE POLYMERIZATION CATALYST AND ETHYLENE POLYMERIZATION PROCESS

[75] Inventors: Juan Raul Quijada Abarca, Porto Alegre; Dellyo Ricardo dos Santos Alvares, Botafogo, both of Brazil

[73] Assignees: Petroleo Brasileiro S.A. - Petrobras, Rio De Janeiro; Polialden Petroquimica S.A., Bahia, both of Brazil

[21] Appl. No.: 08/358,607

[22] Filed: Dec. 14, 1994

Related U.S. Application Data

[63] Continuation of application No. 08/223,818, Apr. 6, 1994, abandoned, which is a continuation of application No. 08/139,868, Oct. 22, 1993, abandoned, which is a continuation of application No. 07/640,543, Jan. 14, 1991, abandoned, which is a continuation of application No. 07/226,906, Aug. 1, 1988, abandoned.

[30] Foreign Application Priority Data

Jul. 31, 1987 [BR] Brazil ..................................... 8703935
Mar. 29, 1988 [BR] Brazil ..................................... 8801441

[51] Int. Cl.⁷ ..................................................... C08F 4/64
[52] U.S. Cl. .................................. 526/124.5; 526/124.3; 526/352; 502/105; 502/120
[58] Field of Search ........................... 520/125; 505/240; 526/124.3, 124.5

[56] References Cited

U.S. PATENT DOCUMENTS 4,069,169  1/1978  Toyoda et al. .......................... 526/906
4,143,223  3/1979  Toyota et al. ........................... 526/906
4,314,911  2/1982  Giannemi et al. ....................... 526/119
4,336,352  6/1982  Sakurai et al. .......................... 525/240

FOREIGN PATENT DOCUMENTS 830112    6/1975  Belgium .
8005302   7/1984  Brazil .
8005670   5/1985  Brazil .
2207931   6/1974  France .
1434264   5/1976  United Kingdom .

OTHER PUBLICATIONS

Boor, Ziefer —Catalysts and Polymerizations, Academic Press. N.Y. (1979) pp. 602–609.

*Primary Examiner*—David W. Wu
*Attorney, Agent, or Firm*—Sughrue, Mion, Zinn, Macpeak & Seas, PLLC

[57] ABSTRACT

A preparation process for a catalytic support, based on a special alumina modified with varying quantities of magnesium chloride is described, a higher rate of $MgCl_2$ leading to a lesser quantity of heavy molecular chains in the final polymer. The support, prepared by milling the special alumina together with the $MgCl_2$ previously treated with ethyl benzoate, is impregnated with $TiCl_4$ in order to create the catalyst. The resulting catalysts show high activity, which enables the metallic residue and chloride eliminating stage to be avoided in the resin so created. Furthermore the types of molecular weight distribution and of mechanical properties are different for the polymers produced.

6 Claims, 1 Drawing Sheet

PROCESS FOR PREPARING AN ETHYLENE POLYMERIZATION CATALYST AND ETHYLENE POLYMERIZATION PROCESS

This is a Continuation of Application Ser. No. 08/223,818 filed on Apr. 6, 1994, now abandoned which is a Continuation Application of Ser. No. 08/139,868 filed on Oct. 22, 1993, now abandoned which is a Continuation Application of Ser. No. 07/640,543 filed on Jan. 14, 1991, now abandoned which is a Continuation Application of Ser. No. 07/226,906 filed on Aug. 1, 1988, now abandoned.

This invention concerns an improved process for preparing a catalytic support for ethylene polymerization and the ethylene polymerization process, the special characteristics of which arise out of said catalytic support. More specifically, the invention concerns the production of the alumina-magnesium chloride support, by milling together the two components, previously activated, thus imparting special activity characteristics to the support so provided, which will be made to react, in the usual way, with titanium tetrachloride and a co-catalyst, for example, triethyl aluminum. This invention further concerns the ethylene polymerization process the high activity of which and easily controlled molecular weight and distribution features are imparted by the new catalytic support disclosed herein.

Furthermore, this invention improves the Ziegler catalytic system characteristics disclosed under U.S. Pat. No. 8,005,670 of the applicant, said system being based on a high surface area and pore volume alumina (described in U.S. Pat. No. 8,005,302) which leads to a support that enables the polymerization of ethylene to take place at extremely high molecular weights. In this present invention the applicant has altered the support disclosed in U.S. Pat. No. 8,005,670 by mixing, in a ball, mill, such special alumina with varying quantities of magnesium chloride previously reacted with an electron donor, such as ethyl benzoate, so that, as the added quantity of magnesium halide varies, other components of the catalytic system being kept constant, the following changes take place in catalytic activity, in molecular weight and in the distribution of the molecular-weight of the polyolefin product of the polymerization reaction, which is followed by variations in mechanical properties, such control being extremely useful and industrially desirable, while not yet fully described in specialized literature.

Furthermore, this application widens and improves the subject matter described in PI Application 87/03935, which also concerns a Ziegler catalytic process.

The preparation of catalytic supports of alumina (or silica) and magnesium chloride is disclosed in several documents, the joining of the two support-forming substances being achieved in different ways. Thus, DE patent 2.352.154 discloses the manufacture of a solid catalytic complex made up of a porous aluminum oxide of pore volume higher than 1.0 $cm^3/g$, a surface area of about 200–400 $m^2/g$, such aluminum oxide being halogenated to increase its activity, after which it is treated with $1.10^{-3}$ atom-mg of Mg per square meter of surface area of aluminum oxide, the Mg being in oxide or halide form and deposited as a suspension in an inert diluent, as a vapour or gas, in an aqueous solution or an organic solvent. After impregnation, the solvent is removed at a temperature below the decomposition temperature of the magnesium compound.

Belgian patent BE 830.112 refers to a catalytic system where a titanium-derived compound is finely dispersed over a substance provided with a high surface area, said substance having been previously treated with an inorganic magnesium compound, especially a Mg halide. In the process disclosed the halide is spread on the support (silica, silica-alumina, alumina, titanium or zirconium oxides), in an aqueous medium, the water is distilled off, and the support is activated by heating at 200–260° C. under reduced pressure. The resulting product is refluxed in liquid $TiCl_4$, filtered, washed with a hydrocarbon, and dried under reduced pressure. The advantage claimed is good sensitivity to hydrogen (for a Mg/Ti ratio of 0.5 to 2.0 in the support), high polyethylene yield, no fines, and high apparent density. Mg content in support ranges from 1 to 5% preferably.

PI Patent 7309158 also describes a catalytic system where the halide or other Mg compound is impregnated on a calcination-activated alumina, and preferably, pre-halogenated. The amount of Mg compound varies between $10^{-4}$ and $10^{-1}$ miliatom-g of metal per square meter of the porous oxide surface area (measured by BET), the ideal surface area of the porous oxide being between 200 and 400 $m^2/g$. The impregnation method for the Mg varies between compound can be either by suspension in an inert diluent or in an aqueous solution or an organic solvent. After impregnation of the Mg compound, the solid secured is activated, the solvent being distilled off. In this patent the average molecular weight, as indicated by the Melt Flow Index (MFI) is controlled through the addition of molecular weight regulation agents, such as hydrogen. The Melt Flow Index increases as a function of the magnesium content in the catalytic complexes. It is claimed that the polyolefins produced have excellent properties in the extrusion and extrusion-blowing molding processes.

PI application no. 7905083 in turn describe the preparation of mixed alumina-magnesium chloride supports where alumina is impregnated with magnesium choloride at a rate of 5.75% by weight of the alumina, dissolved in an alcohol solution, the alcohol being evaporated after the impregnation. In Table 1 hereof figures are given to show that upon reducing the magnesium chloride content on the alumina and varying the quantity of titanium attached to the support, the plotting of yield and specific activity provides a Gauss-type curve, which parameters increase when the halide content rises from 0.5:1 alumina/halide to 9:1 of halide, and diminishes when the halide proportion present is as little as 19:1 to 49:1.

Like known processes this invention employs a solid catalytic support of alumina-magnesium chloride, the features peculiar to it arising from the fact that the alumina on which the halide is supported is the applicant's proprietary alumina, referred to in U.S. Pat. No. 8,005,302, the method for preparation of which imparts to it special activity characteristics, one of these being the exceptionally high volume of pores which together with a high surface area leads to polymers of heavy molecular weight, while other characteristics of the mixed support are brought about by the preparation process used for the solid alumina-magnesium chloride support, as will be disclosed below.

This process relates to a method for preparing aluminum oxide from the calcination of a complex basic, aluminum-ammonium carbonate, at a temperature comprised between 350 and 750° C., such complex basic, aluminum-ammonium carbonate being prepared from precipitation following the pH-controlled reaction between ammonium bicarbonate, ammonium hydroxide and aluminum nitrate or sulfate.

This invention produces an aluminum oxide which has a pore volume higher than every aluminum oxide heretofore produced, while combining high surface area and high purity.

Aluminum oxide is widely known and used in chemical processes, yet is limited by some physico-chemical characteristics. Particularly, in the Ziegler-Natta catalysts, characteristics such as surface area, pore dimension and pore distribution in alumina are intimately linked to the catalytic activity of these particles.

The present state of the art discloses pore volumes between 0.3 and 0.8 cm$^3$/g and surface areas up to 200 m$^2$/g. Higher values are reported only as isolated, special experiments, without industrial application.

This invention discloses a process for preparing alumina having pore volumes in excess of 3.0 cm$^3$/g, the surface areas reaching 200 to 500 m$^2$/g. This process comprises heating between 350 and 700° C. a basic, complex aluminum-ammonium carbonate which in turn results from the reaction of aluminum nitrate or sulfate with ammonium bicarbonate in the presence of concentrated ammonium hydroxide.

It is well-known that alkaline or alkaline-earth metals in calcined, industrial aluminas, reduces their catalytic activity. Also, processes such as extensive washing have failed in eliminating such undesirable cations. The contamination arises from the synthesis of alumina, which comprises the precipitation of aluminum hydroxide from an alkaline aluminate hydrolysis followed by calcination. Even when the alumina product is pure, its pore volume and surface area are inadequate.

It has now been found that the precipitate resulting from the carefully controlled reaction of aluminum nitrate or aluminum sulfate and ammonium bicarbonate in the presence of ammonium hydroxide has a unique structure which renders it specially suited for, after calcination, producing aluminum oxide having high surface area and high pore volume, besides a good attrition resistance, this kind of material being heretofore unknown. Also, this material does not require any subsequent treatment in order to secure its purity, since it is free of alkaline or alkaline-earth metals.

The present inventive process requires a series of operational steps, the success of which depends on how carefully are controlled the various steps. FIGS. 1 and 2 represent preferred embodiments of the invention.

FIG. 1: Tank (1) equipped with stirrer (2) contains an ammonium bicarbonate (NH$_4$HCO$_3$) solution.

A 1:1 concentrate ammonium hydroxide (NH$_4$OH) solution is added to tank (1) from tank (5) through an automatic control valve (12) under controlled flow so as to maintain reagent tank (1) pH at a previously set value during the addition of aluminum nitrate or aluminum sulfate. Tank (1) is connected to a circulating pump (7) which takes continually samples out through line (6) into control vessel (9) through line (8). In control vessel (9), a probe electrode (10) sends a signal to the pH meter (11) which, besides giving the sample pH, also influences the control valve (12) and controls the NH$_4$OH solution flow according to the pH set in the apparatus (11) dial. After monitoring in vessel (9), the sample is sent back to tank (1).

The following steps are indicated in FIG. 2.

After all the solution in tank (2) is added to the contents of tank (1) and the pH is corrected to a previously set value, the reactants are transferred to a filter aid (13) where the precipitate is filtered off, thoroughly washed (by means of deionized water which has been added through line (14) and discarded through line (15)) and dried in an an oven (16).

The dried product is characterized through X-Rays, thermogravimetry, CHN analysis, Kjeldahl, and carbon assay through controlled combustion.

The product from oven (16) is then calcined in a furnace (17) at 350–700° C. for 5 to 15 hours, so as to obtain an aluminum oxide of high pore volume and high surface area.

The general procedure comprises adding an ammonium bicarbonate buffer solution at pH 8.0 (23 wt % solution) to a 25 wt % solution of aluminum nitrate, the pH being controlled between 7.5 to 7.7 by means of a 1:1 solution of concentrated ammonium hydroxide. Generally, the molar ratio of ammonium bicarbonate and aluminum nitrate is between 3.0 and 4.0. The gel-like precipitate is filtered off and washed with deionized water in order to be dried and calcined at various temperatures.

The basic, complex aluminum-ammonium carbonate can also be prepared at variable pH. In this embodiment, the same equipment is used, except the circulating pump (7), the control vessel (9) and the tank (5), besides the automatic equipment, since there is no need to add ammonium hydroxide throughout the process in order to adjust pH.

According to this embodiment, an aluminum nitrate or aluminum sulfate solution is placed initially in tank (1) the pH being in the acid range (2.7). Tank (2) contains an ammonium bicarbonate solution at pH 8.0. Tank (2) solution is added to tank (1) solution, under agitation, after which a gel-like precipitate is formed, between pH 4.6 and 5.0. The addition of ammonium bicarbonate solution is continued and, at pH 5.5, the precipitate separates, the final pH being 8.0. The precipitate is then aged for 30 days.

Table I below lists, for various samples (A to J) the influence of temperature and calcination time on surface area and pore volume.

TABLE I

| SAMPLE | TEMPERATURE ° C. | TIME (h) | SURFACE AREA m$^2$/g | PORE VOLUME ml/g |
| --- | --- | --- | --- | --- |
| A | 250 | 5 | 286 | 2.26 |
| B | 250 | 16 | 379 | 2.75 |
| C | 350 | 5 | 540 | 3.18 |
| D | 350 | 16 | 521 | 3.30 |
| E | 450 | 5 | 373 | 2.89 |
| F | 450 | 16 | 358 | 2.88 |
| G | 550 | 5 | 236 | 2.74 |
| H | 550 | 16 | 266 | 2.53 |
| I | 700 | 5 | 198 | 2.65 |
| J | 700 | 16 | 176 | 2.28 |

From Table I it is seen that between 250 and 700° C. it is produced an aluminum oxide of pore volume higher than 2.0 ml/g and surface area in excess of 170 m$^2$/g and that the best results are obtained at 350° C. for 16 hours, although from 5 hours on the results are already good. Generally if the temperature is around 700° C. surface area is reduced, while the pore volume is nearly not altered.

In another series of experiments, a 34 wt % ammonium bicarbonate solution was added stepwise under constant agitation to a 20 wt % solution of aluminum sulfate, the pH being kept between 7.5 and 7.7 by means of a 1:1 concentrated ammonium hydroxide solution.

The molar ratio between ammonium bicarbonate and aluminum sulfate was kept between 3.0 and 4.0 throughout the reaction. The precipitate was filtered off, washed with deionized water, dried and calcined at different temperatures.

Table II below lists the influence of the calcination temperature on surface area and pore volume for the above-mentioned set of experiments.

TABLE II

| SAMPLE | CALCINATION TEMPERATURE ° C. | TIME (h) | SURFACE AREA $m^2/g$ | PORE VOLUME ml/g |
|---|---|---|---|---|
| P | 250 | 5 | 376 | 1.53 |
| Q | 350 | 5 | 329 | 1.93 |
| R | 450 | 5 | 437 | 2.33 |
| S | 550 | 5 | 355 | 2.27 |
| T | 700 | 5 | 279 | 2.00 |

In case of the gel-like product obtained from aluminum sulfate, calcination was conducted for 5 hours, the best results arising from temperatures between 450 and 700° C.

Thus, one object of this invention is to prepare a catalytic support and Ziegler type catalyst suitable to polymerize ethylene, along with molecular weight control and molecular weight distribution control, and a high proportion of heavy molecular chains. These characteristics are due to the different types of active sites created by the supports.

Another object of this invention is, by varying the content of magnesium in the support, to estimate with some degree of accuracy the end properties of the resulting polyethylenes, so as to obtain resins of completely controlled physical and mechanical properties.

Still another object is to reach a high catalytic activity rate without having to eliminate any metals or chloride from the polymer.

Actually, after the addition of the titanium component, the way of preparing the solid catalytic support of this invention leads to a catalytic system which enables not only a precise control to be kept over the MW and the MW distribution of the polymers produced but also certain polyethylene grades of a high rate of heavy MW chains to be made. As is well known by those skilled in the art, the two parameters: MWD and quantity of heavy MW chains bring about polymer properties, chiefly their mechanical properties.

Furthermore, in the system invented, MW and MWD are narrower rates than in the heretofore known systems, thus allowing for specific application thereof.

Therefore this is an invention whereby the method of preparing a catalytic support consists of the following stages:

A) Preparation of the support.

a) Milling analytical grade magnesium chloride in a ball mill together with 10% by weight of ethyl benzoate in an inert atmosphere, at room temperature, for about 48 hours.

b) Calcining at 600–800° C., preferably 700–750° C., the special alumina—high surface area of about 200–500 $m^2/g$, and pore volume from 1.3 to 3.5 $cm^3/g$—for 4–8 hours, preferably 5 hours.

c) Thorough mixing of activated alumina at b) with rates from zero to 100% by weight of the $MgCl_2$ prepared in a), blending to be done in a ball mill, at room temperature, for about two hours, in an inert atmosphere.

B) Preparation of Catalyst a) In order to impregnate the support made in a) prepare a suspension thereof in 5 to 7.5 times by volume/weight of $TiCl_4$ so that the final content of deposited Ti becomes 1.5 to 2.0%.

b) Wash surplus $TiCl_4$ off with n-hexane at 50° C.

The polymerization reaction to produce ethylene is carried out in a one gallon (3.78 liters) capacity Parr type reactor, with inert solvent, preferably n-hexane, with triethylaluminum or triisobutyl aluminum as co-catalyst, at an Al/Ti rate from 10/1 to 100/1 or 40/1 to 100/1 respectively. The pressure of the ethylene is kept constant at 6 $kgf/cm^2$, molecular weight being controlled by adding hydrogen at a pressure of 3 $kgf/cm^2$. Temperature is kept at 80°–95° C. for one hour. Upon completion of the reaction, the reactor pressure is removed and the polymer is recovered as an n-hexane suspension. The resin is decanted and dried to a dry powder.

The following examples illustrate the invention but without limiting the scope thereof:

EXAMPLE 1 a) Preparing alumina 45 g of less than 200 mesh (0.074 mm) particle size dawsonite are calcined at 700° C. in an argon atmosphere for 5 hours. This thermal treatment provides 17 g of alumina with a surface area of 250 $m^2/g$ and pore volume of about 1.0 $cm^3/g$.

b) Preparing $MgCl_2$- BzOEt 7.0 g of $MgCl_2$ and 0.7 g of ethylbenzoate are placed in a ball mill, in an inert atmosphere. Activation of the $MgCl_2$ is achieved by milling this support in a mechanical vibrator for 48 hours.

c) Preparing support

Physical mixing of the two supports is achieved by milling 14.0 g of alumina together with 6.7 g of the $MgCl_2$ ethyl benzoate compound prepared in the previous step. This is done in a ball mill, in an inert atmosphere, for 2 hours.

d) Making catalyst 20 g of a physical mixture of $Al_2O_3$-$MgCl_2$ are placed in a glass flask provided with a magnetic stirrer and a reflux condenser. Then 150 ml of $TiCl_4$ are added, reaction being kept at constant temperature of 80° C., for 2 hours. After the reaction is finished the catalyst is washed several times with 1.5 liters of n-hexane at 50° C. The titanium content found experimentally in the catlyst was 1.7%.

e) Ethylene polymerization

In a reactor of 4 liters capacity 50 mg of catalyst and 1.35 ml of a 0.35M triethylaluminum solution to act as a co-catalyst are suspended in 2 liters of n-hexane. Thus, the molar ratio of Al/Ti was 50/1. The catalyst components are added at a temperature ranging between 30–50° C. Hydrogen is injected into the reactor at a pressure of 3 $kgf/cm^2$. Then ethylene is fed continuously during the reaction at a pressure of 6 $kgf/cm^2$ The polymerization reaction takes place at 85° C. over an hour.

480 g of polyethylene are produced, catalyst activity being 560,000 g PE/gTih. The figures for activity, molecular weight and its distribution, as well as the physical and mechanical properties are shown in Tables 1 and 2 respectively.

EXAMPLE 2

Preparation stage for the different supports is the same as described in Example 1, rate of the physical mixture being varied in order to produce a 50—50% mixture of the components. Catalyst synthesis and polymerization stages were were repeated. 420 g of polyethylene were produced, at a catalytic activity of 700,000 gPE/g with, other results being listed in Tables 1 and 2.

EXAMPLE 3

In this example only alumina was used as a support. Procedure to obtain catalyst and polymer is the same as described in example 1. Results are given in Tables 1 and 2.

EXAMPLE 4

In this example the support was MgCl alone, method of preparing catalyst and polymer having been a repetition of that in example 1. The results are shown in Tables 1 and 2.

EXAMPLES 5 AND 6

Mixtures with high contents of $Al_2O_3$ or $MgCl_2$ were also prepared. In the case of 15% $MgCl_2$, the results show a substantial increase in catalytic activity as compared with the catalyst of example 3. As regards mechanical properties (impact and tensile strength), seen to have dropped as compared with those of example 3, but even so they are still high.

In the case of the catalyst containing 85% $MgCl_2$, a great increase in catalytic activity noticed, but mechanical properties dropped steeply. Results are given in Tables 1 and 2.

As is to be seen from Tables 1 and 2, the chief advantages of these new catalysts are the high catalytic activity reached and the possibility of controlling (tailoring) the molecular weight and its distribution, as well as the physical and mechanical properties.

An examination of Table 1 serves to show that for catalysts with a greater quantity of $MgCl_2$ in the support, catalytic activity will rise. As regards physical and mechanical properties the figures in Table 2 serve to show the effect of the type of catalytic system employed. Mechanical properties are greatly influenced by the molecular weight, varying in a manner direc directly proportional to molecular weight and its distribution. In Table 2 the results under examples 1 and 5 show that the polymers synthesized from catalysts containing less $MgCl_2$, and thus more alumina, have a higher molecular weight, and a MW distribution which has a higher rate of heavy molecular fractions, which means better mechanical properties. As the alumina in the support increases, mechanical properties will improve. Furthermore, the higher quantity of $MgCl_2$ in the catalysts, besides imparting higher rates of catalytic activity, lead to polymers that have greater melt flow and apparent density rates. The marked effect of the MW and of the MWD on the physical and mechanical properties of polymers should be pointed out.

Thus, through the use of the different catalytic systems one can select the different grades desired of polyethylene, within the range of existing applications, the latter being a function of the type of polymer produced.

EXAMPLES 7 TO 12

Using a catalyst containing 30%, $MgCl_2$ in the support, method preparing it being the same as described in Example 1, the effect of the aluminum/titanium mollar rates upon catalytic activity and the mechanical properties was studied. The co-catalyst employed in these examples was triethyl aluminum (TEA). The results are shown in table 3.

EXAMPLES 13 TO 17

In these examples triisobutyl aluminum (TIBA) was substituted for triethylaluminum; the same catalyst as that of examples 5 to 12 was employed, while polymerization procedure already referred to was followed. The effect of the aluminum/titanium molar ratio upon the catalytic activity was checked, as well. Results are shown in table 4.

A study of tables 3 and 4, together with FIG. 1, serves to evaluate the behaviour of catalytic activity in terms of changes in Al/Ti molar ratios and of the nature of the co-catalyst used.

Changes in the aluminum/titanium ratio produce changes that are quite significant in the size of catalytic activity when triethyl aluminum is used as a co-catalyst. Joint study of examples 7 to 12 serves to show that there is a maximum figure for the catalytic activity (example 8), which is the maximum point on Curve A in FIG. 1. Thus the quantity of triethyl aluminum had a decided effect upon the degree of activity of the final catalytic system produced.

As regards mechanical properties, the changes in the aluminum/titanium ratio do not affect them, nor do they significantly alter previous results.

As for examples 13 to 17, two distinct types of behaviour were noticed concerning changes in catalytic activity in terms of Al/Ti molar ratios. It was found that for Al/Ti ratios<10, no polymer resin could be produced, due to the extremely low degree of activity of the catalytic systems created. The other kind of behaviour noticed was that of the linearity displayed when the Al/Ti ratio was between 40 and 100 (curve B graph 1).

As in examples 7 to 12, there were no significant changes in mechanical properties in terms of changes in the Al/Ti ratios.

The results shown in tables 3 and 4 lead to the conclusion that the use of TIBA leads to higher figures for catalytic activity; however, polymers produced with use of TIBA for polymerization are morphologically much more irregular as compared to those obtained with triethyl aluminum.

TABLE 1

| EXAMPLE NO. | % MgCl2 | % Ti | YIELD (g) | CATALYTIC ACTIVITY (g PE/g Ti h) |
|---|---|---|---|---|
| 3 | 0 | 2.0 | 340 | 150,000 |
| 5 | 15 | 1.4 | 320 | 450,000 |
| 1 | 30 | 1.7 | 480 | 560,000 |
| 2 | 50 | 1.2 | 420 | 700,000 |
| 6 | 85 | 1.4 | 700 | 1,425,000 |
| 4 | 100 | 1.3 | 685 | 1,496,000 |

TABLE 2

| EXAMPLE NO. | % MgCl$_2$ | MECHANICAL PROPERTIES | | | ROCKWELL HARDNESS | Mw by G.P.C.* | | | | PHYSICAL PROPERTIES | |
|---|---|---|---|---|---|---|---|---|---|---|---|
| | | TENSILE STRENGTH (kgf/cm$^2$) | ELONGATION % | IMPACT STRENGTH (kg cm/cm) | | Mn 10$^3$ | Mw 10$^3$ | % FRACTIONS MW $\geq$ 10$^5$ | % FRACTIONS MW $\geq$ 10$^6$ | M.F.I. (g/10 min) | App. DENSITY (g/cm$^{-3}$) |
| 3 | 0 | 430 | 400 | does not break | 72 | — | — | — | — | 0 | 0.21 |
| 5 | 15 | 360 | 830 | 80 | 73 | 34 | 270 | 55 | 6.5 | 0.10 | 0.21 |

TABLE 2-continued

| | | MECHANICAL PROPERTIES | | | | Mw by G.P.C.* | | | | PHYSICAL PROPERTIES | |
|---|---|---|---|---|---|---|---|---|---|---|---|
| EXAMPLE NO. | % MgCl$_2$ | TENSILE STRENGTH (kgf/cm$^2$) | ELONGA- TION % | IMPACT STRENGTH (kg cm/cm) | ROCKWELL HARDNESS | Mn 10$^3$ | Mw 10$^3$ | % FRAC- TIONS MW $\geq$ 10$^5$ | % FRAC- TIONS MW $\geq$ 10$^6$ | M.F.I. (g/10 min) | App. DENSITY (g/cm$^{-3}$) |
| 1 | 30 | 300 | 850 | 65 | 73 | 33 | 254 | 47 | 6.5 | 0.16 | 0.24 |
| 2 | 50 | 255 | 900 | 50 | 73 | 24 | 193 | 39 | 4.5 | 0.26 | 0.24 |
| 6 | 85 | 225 | 900 | 35 | 73 | 24 | 185 | 36 | 3.8 | 0.30 | 0.26 |
| 4 | 100 | 200 | 1000 | 30 | 73 | 23 | 178 | 35 | 3.5 | 0.32 | 0.25 |

*G.P.C. = Gel Permeation Chromatography.

TABLE 3

| | | MECHANICAL PROPERTIES | | | |
|---|---|---|---|---|---|
| EXAMPLE NO. | Al/Ti RATIO | CATALYTIC ACTIVITY (g PE/g Ti h) | TENSILE STRENGTH (kgf/cm$^2$) | ELONGATION % | IMPACT STRENGTH (kg cm/cm) | ROCKWELL HARDNESS |
| 7 | 5 | 190,000 | * | * | * | * |
| 8 | 10 | 700,000 | 388 ± 12 | 964 ± 26 | 85.8 ± 3.2 | 83 ± 0 |
| 9 | 25 | 600,000 | 351 ± 32 | 968 ± 30 | 84.5 ± 3.6 | 81 ± 1 |
| 10 | 50 | 550,000 | 384 ± 12 | 964 ± 26 | 83.2 ± 3.0 | 80 ± 1 |
| 11 | 75 | 390,000 | 376 ± 18 | 932 ± 30 | 83.1 ± 1.6 | 81 ± 0 |
| 12 | 100 | 360,000 | 364 ± 14 | 980 ± 0 | 73.4 ± 2.0 | 81 ± 1 |

Note:
Support - at 30% MgCl$_2$ 70% alumina mixture; co-cat: TEA
* The mechanical properties data for example 7 could not be determined because of a lack of polymer at Al/Ti = 5

TABLE 4

| | | MECHANICAL PPOPERTIES | | | |
|---|---|---|---|---|---|
| EXAMPLE NO. | Al/Ti RATIO | CATALYTIC ACTIVITY (g PE/g Ti h) | TENSILE STRENGTH (kgf/cm$^2$) | ELONGATION % | IMPACT STRENGTH (kg cm/cm | ROCKWELL HARDNESS (R) |
| 13 | 5 | * | * | * | * | * |
| 14 | 10 | * | * | * | * | * |
| 15 | 40 | 795,000 | 338 ± 15 | 896 ± 22 | 95.1 ± 2.7 | 77 ± 0 |
| 16 | 70 | 850,000 | 367 ± 13 | 880 ± 0 | 93.8 ± 2.3 | 77 ± 1 |
| 17 | 100 | 875,000 | 351 ± 15 | 852 ± 18 | 91.3 ± 2.1 | 79 ± 1 |

NOTE:
Support - MgCl$_2$/Alumina 30/70 (% by weight): co-cat: TIBA
* For examples 13 and 14 the data for catalytic activity and mechanical properties could not be determined because no polymerization occurred in such range of aluminum-titanium ratio.

We claim:

1. A process for polymerizing ethylene at low pressure comprising
  (A) preparing a polymerization catalyst in the following stages:
    (a) milling analytical grade magnesium chloride in a ball mill with 10% by weight of ethyl benzoate in an inert atmosphere, at room temperature, for about 48 hours, up to suppression of the 2.56 A peak in the X-ray spectrum;
    (b) calcining at 600–800° C., alumina of about 200–500 m$^2$/g of surface area and pore volume between 1.3 and 3.5 cm$^3$/g, for 4–8 hours;
    (c) mixing thoroughly the activated alumina of b) with rates ranging from 15 to 85% by weight, of the MgCl$_2$ prepared in a), the mixing being done in a ball mill at room temperature, for at least two hours, in an inert atmosphere;
    (d) impregnating the support prepared in c) with 5 to 7.5 times by weight of titanium tetrachloride in an inert atmosphere and stirring for two hours at 80° C., so as to deposit from 1.3 to 2.0% by weight of titanium; and
    (e) washing the surplus TiCl$_4$ off with n-hexane at 50° C.; and
  (B) contacting the impregnated and washed support with ethylene to be polymerized, to provide a polyethylene which comprises (i) high molecular weight chains having MW$\geq$10$^6$ in an amount of 3.5 to 6.5 wt % of the total polyethylene, and (ii) lower molecular weight chains having MW$\geq$10$^5$ in an amount of 35 to 55 wt % of the total polyethylene, wherein the melt flow index of the polyethylene is from 0.32 to 0.10 g/10 min.

2. A process for polymerizing ethylene at low pressure comprising
  (A) preparing a polymerization catalyst in the following stages:
    (a) milling analytical grade magnesium chloride in a ball mill with 10% by weight of ethyl benzoate, in an inert atmosphere, at room temperature, for about 48 hours, up to suppression of the 2.56 A peak in the X-ray spectrum;

(b) calcining at 600–800° C. alumina of about 200–550 m²/g of surface area and pore volume between 1.3 and 3.5 cm³/g, for 4–8 hours;

(c) mixing thoroughly the activated alumina of b) at rates ranging from 15 to 85% by weight, of the $MgCl_2$ prepared in a), the mixing being done in a ball mill at room temperature, for at least two hours, in an inert atmosphere;

(d) impregnating the support prepared in c) with 5 to 7.5 times by weight, of titanium tetrachloride and stirring for two hours at 80° C., so as to deposit from 1.3 to 2.0% by weight of titanium on the support;

(e) washing the surplus $TiCl_4$ off with n-hexane at 50° C.; and (B) contacting the impregnated and washed support with ethylene to be polymerized, to provide a polyethylene which comprises (i) high molecular weight chains having MW≧10⁶ in an amount of 3.5 to 6.5 wt % of the total polyethylene, and (ii) lower molecular weight chains having MW≧10⁵ in an amount of 35 to 55 wt % of the total polyethylene, wherein the melt flow index of the polyethylene is from 0.32 to 0.10 g/10 min.

3. A process according to claim 1, whereby the quantity of heavy molecular chains in the resulting polyethylene is inversely dependent on the quantity of $MgCl_2$ in the catalyst support.

4. A process according to claim 1, wherein a co-catalyst is present during said contacting step, wherein the co-catalyst is triethyl aluminum at an Al/Ti molar ratio of from 10/1 up to 100/1, or triisobutyl aluminum, at a molar ratio of from 40/1 up to 100/1, at a pressure of 3 kgf/cm² of hydrogen and 6 kgf/cm² of ethylene, the temperature being 80–90° C., for one hour, or more.

5. A process according to claim 1, wherein a co-catalyst is present during said contacting step, wherein the co-catalyst is triethyl aluminum.

6. A process according to claim 1, wherein a co-catalyst is present at an Al/Ti ratio during said contacting step, wherein the resulting polyethylene has a tensile strength ranging from 390 to 225 kgf/cm, Izod impact strength between 95 and 35 kg.cm/cm, elongations between 830 and 980% and Rockwell hardness of about 83 due to the quantity of $MgCl_2$ in the mixture, the sort of co-catalyst employed and the Al/Ti ratio.

* * * * *